(12) United States Patent
Li et al.

(10) Patent No.: US 7,725,435 B1
(45) Date of Patent: May 25, 2010

(54) METHOD AND APPARATUS FOR A DYNAMIC WEB PORTAL WITH CONTENT DISTRIBUTED NETWORK CONTENT AVAILABILITY AND USER LOCALITY

(75) Inventors: Dan Li, Sunnyvale, CA (US); Ivy K. Lui, San Carlos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1471 days.

(21) Appl. No.: 10/736,436

(22) Filed: Dec. 15, 2003

(51) Int. Cl.
*G06F 7/00* (2006.01)
(52) U.S. Cl. ...................... 707/626; 707/637
(58) Field of Classification Search .............. 725/42; 705/64; 715/513; 707/3, 5, 9, 100; 709/224, 709/217
See application file for complete search history.

(56) References Cited

U.S. PATENT DOCUMENTS

| 2002/0146015 | A1* | 10/2002 | Bryan et al. ................. 370/401 |
| 2002/0156864 | A1* | 10/2002 | Kniest ......................... 709/217 |
| 2003/0050931 | A1* | 3/2003 | Harman et al. ............... 707/100 |
| 2003/0110253 | A1* | 6/2003 | Anuszczyk et al. .......... 709/224 |
| 2003/0126558 | A1* | 7/2003 | Griffin ........................ 715/513 |
| 2004/0123238 | A1* | 6/2004 | Hefetz et al. ................ 715/513 |

* cited by examiner

*Primary Examiner*—Charles Rones
*Assistant Examiner*—Fariborz Khoshnoodi
(74) *Attorney, Agent, or Firm*—Hickman Palermo Truong & Becker LLP

(57) ABSTRACT

A system for providing a dynamic portal page in a content distributed network responds to a client request by generating the dynamic portal page at a content engine. The content engine has a portal template with at least one dynamic portion. The content engine writes into the at least one dynamic portion of the portal template links to content cached at the content engine. The content engine also writes into the at least one dynamic portion of the portal template information about availability of content not yet cached at the content engine.

21 Claims, 6 Drawing Sheets

METHOD AND APPARATUS FOR A DYNAMIC WEB PORTAL WITH CONTENT DISTRIBUTED NETWORK CONTENT AVAILABILITY AND USER LOCALITY

BACKGROUND OF THE INVENTION

A Content Distributed Network (CDN) enables web content from an origin server to be distributed to caching servers at various locations in a large network, such as the Internet. The CDN then enables client systems to access the web content from those caching servers. The caching servers are also called content engines, or alternatively, content servers. Content routers in the CDN route client requests to an appropriate content engine. When a client requests a Web page, for example, that is part of the CDN, the CDN typically redirects the request from the origin server to a content engine that is closest to the client. The content engine delivers the cached content to the client. The CDN also communicates with the origin server to deliver any content that has not been previously cached. This service is effective in speeding the delivery of content of Web sites with high traffic and also of Web sites that have geographically distributed customers. Additionally, CDNs can be configured to provide protection to origin servers from large surges in traffic. Distribution of content reduces the load on the origin servers where content originates. Furthermore, clients are provided with improved access to content because the clients are able to obtain content from a caching server that is closer (in terms of network distance and congestion) and less heavily loaded than the origin server.

To make content efficiently available through the CDN, a content provider defines one or more "channels". Each channel contains a set of files that is typically expected to be accessed by the same set of users. For example, a channel may contain training videos intended to be used by sales people, or advertisements directed at an organization's customers. A subset of the content engines in the CDN is assigned to each channel. The content engines in the assigned subset are typically servers located conveniently with respect to the intended set of users of the channel.

Files in a channel are pre-positioned at the content engines assigned to that channel. Pre-positioning enables greater certainty of availability of the content to accessing client systems. The content engines assigned to the channel may be behind a slow link relative to the origin server, and the files themselves may be very large. Therefore, moving the content from the origin server to a content engine can be time-consuming. Pre-positioning the content generally reduces delay when users attempt to access files.

Pre-positioning includes an indication of what content is carried in the channel. One technique for describing current channel content is a "manifest file." The manifest file describes the channel content through a set of rules. Rules can be as simple as providing the file name of a file in the channel. Rules can also be more complicated, e.g., indicating all files in a directory with a particular suffix.

Content engines in the channel periodically evaluate the rules in the manifest file to determine the current content of the channel. The result of evaluating the rules is a "catalog", also referred to as a dataset, that identifies the files currently in the channel with their associated properties, e.g., an indication of where the file is coming from, or how often the file should be checked to see whether it has been modified, and therefore, needs to be re-fetched.

Each content engine maintains a replication status to monitor progress in obtaining content. The replication status typically includes data on the number of files copied to the content engine, the number of files that remain to be copied, the number of files failed, and a total number of files in the channel. The content engine, through the replication status, knows the status of the content it has cached as well as the content that remains to be acquired.

Users logged on to client systems access the content of the CDN through a portal page (also referred to simply as a "portal") running on the browser programs at the client systems. A portal is a starting point, or a "gateway", to the Web or to an intranet. A portal can also be used to provide a starting point for accessing the CDN. Portals generally provide consistent user interfaces for network access. The portal typically includes services such as a search engine and directories.

SUMMARY OF THE INVENTION

Conventional network technology does not provide a dynamic portal page including information about both data cached and data pre-positioned at a content engine connected to the network and about data availability at the content engine. A network without these elements provides a network user with a less than optimal interface. When a user knows which files are immediately available, the user can choose to download those files as opposed to files that are not cached at the content engine. While the files that are not found in the content engine are generally available, the time to obtain uncached or un-prepositioned files may be slow and may, in fact, exceed download threshold times resulting in timeout errors. A user informed about data availability can select more readily available data and avoid lengthy downloads.

Embodiments of the present invention significantly overcome such deficiencies and provide mechanisms and techniques for a dynamic portal with content distributed network content availability and user locality. In a content distributed network (CDN), a content engine dynamically generates a portal page based on content availability at the content engine and user location. The dynamically-generated portal page includes links to content at the content engine and provides availability information about CDN content that is not currently stored at the content engine. This provides the user with the opportunity to request content that is readily available at a local server thus reducing requests forwarded to a central server. From the user's point of view, response time for requests for information offered at the portal is fast.

More specifically, embodiments of the invention provide methods and apparatus that dynamically provide a portal in a content distributed network. One such method embodiment includes the step of receiving at a content engine a request from a client system for the portal. The content engine then accesses a portal template in response to the request. The portal template has at least one dynamic portion. The content engine then includes into the at least one dynamic portion of the portal template links to content cached in the content engine. The content engine also includes into the at least one dynamic portion of the portal template information about content availability. In this way, the content engine generates a portal page. The content engine then provides the generated portal page to the client system. The generated portal page accordingly includes the latest information cached at the content engine, but also information about content availability informing the user what data is readily available and what data is not readily available.

In another embodiment of the invention, the step of including information about content availability further includes the step of comparing a replication status to a catalog of files carried in the content engine to determine what files are locally cached and what files remain to be downloaded. The content engine then writes a list of files that remain to be downloaded to the portal page with an indicator of unavailability. The content engine uses elements of the content distributed network to determine information to include into the dynamic portal page. The content engine provides information about available content and unavailable content.

In another embodiment of the invention the step of including links to content cached in the content engine further includes the step of checking a replication status of the content engine to determine available cached content. The content engine then includes into the at least one dynamic portion of the portal template links to content found in the replication status. In a further alternate arrangement, the content engine hides at least one link in the at least one dynamic portion of the portal template to content not found in the replication status. In this embodiment, the user is shown the available content, which is therefore also accessible, while unavailable content is hidden from the user.

In another embodiment of the invention, the portal template includes at least one applet. The content engine then executes the at least one applet to acquire at least one pointer, such as a link, to content cached in the content engine. The content engine then includes the pointers to the at least one dynamic portion of the portal template. In an alternate arrangement, the content engine provides the portal template having the at least one applet to the client system where the client system executes the applet to acquire content cached in the content engine. This embodiment moves portal page generation from the content engine to the client, however, the content engine determines the data to insert into the dynamic portion of the portal template.

In another embodiment of the invention, content engine accesses a portal template stored in the content engine. In another arrangement, the content engine access a portal template stores at a portal page server in the content distributed network. The portal page is accessible at various places in the network within the scope of the invention.

In another embodiment of the invention, the request is a redirected request from the client system. The request is redirected away from the central site and to the content engine by a content router in the content distributed network. In an alternative arrangement, the content engine receiving the redirected request is selected on the basis of network location with respect to the client system. The request, within a content distributed network, is redirected from a central server that may be distant in network terms from the client system. The request is directed instead toward a content engine typically close by in network terms in relation to the client system.

In another embodiment of the invention, the request received from the client system at the content engine is a search request. The content engine then queries a central server in response to the search request. The content engine receives in response to the search request a list of files from the central server. The content engine then includes links into the portal template to files from the list that are cached in the content engine. The client can form a request modifying the information inserted into the dynamic portal page by the content engine.

In another method embodiment of the invention, a content engine dynamically provides a portal to a channel in a content distributed network. The content engine receives a request for the channel portal from a client system. The content engine then accesses a channel portal template in response to the request where the channel portal template has at least one dynamic portion. The content engine then includes into the least one dynamic portion links to content cached in the content engine and information about content availability to generate a channel portal page. The content engine then provides the channel portal page to the client system. The portal page provides a dynamic portal to a channel, which holds pre-positioned files. The portal provides information about the status of the channel files, specifically, those that are pre-positioned in the cache in the content engine and those that are not yet pre-positioned.

In another embodiment of the invention, the step of including links to content further includes the steps of checking a replication status of the content engine to determine channel content available at the content page. The content engine includes into the at least one dynamic portion of the channel portal template links to channel content found in the replication status to generate the channel portal page. Elements of the content distributed network are used to provide information about content available at the content engine.

In another embodiment of the invention, the request includes a search query for content in the channel and the channel portal template includes an applet accepting a first input of the search query and a second input of a list of content in the channel. The content engine executes the applet to find content matching the search query. The content engine then determines whether the content matching the search query is cached at the content engine. The content engine then includes into the at least one dynamic portion of the channel portal template links to channel content cached at the content engine. The user can, accordingly, modify the data included in the dynamic channel portal page.

In an apparatus embodiment of the invention, a content engine dynamically provides a portal in a content distributed network. The content engine includes a network interface to receive a request for a portal from a client system. The content engine further includes a storage device to store content from the content distributed network and a portal template having at least one dynamic portion. The content engine further includes a controller coupled to the interface and to the storage device. The controller is configured to access the portal template in response to the request, to include in the at least one dynamic portion of the portal template links to content cached in the content engine and information about content availability to generate a portal page. The content engine then provides the portal page to the client system. The system provides information about available content and also about unavailable content at the content engine.

In another arrangement of the invention, the storage device further includes a replication status of the content engine and the controller is further configured to check the replication status to determine available cached content. The controller further includes into the at least one dynamic portion of the portal template links to content found in the replication status. Elements of the content distributed network are used to provide information about content available at the content engine.

In another arrangement of the invention, the portal template includes at least one applet and the controller is configured to run the at least one applet to acquire at least one pointer to content cached in the content engine. The portal template is active as well as dynamic and not dependent on some outside source to determine content to insert into the dynamic portion of the portal page. This increases portability of the portal template.

In another arrangement of the invention, the portal is a channel portal and the portal template is a channel portal template. The controller of the content engine includes into the at least one dynamic portion of the channel portal template links to content cached in the content engine to generate a channel portal page. In a further alternative arrangement, the storage device stores a replication status of the content engine and the controller is configure to check the replication status to determine available channel content. The content engine includes into the at least one dynamic portion of the channel portal template links to channel content found in the replication status to generate a channel portal page. The portal page is a portal to a channel having pre-positioned data with the additional benefit of providing information of the data status.

In another embodiment of the invention, the request includes a search query for content in the channel. The channel portal template includes an applet that accepts a first input of the search query and a second input of a list of content in the channel. The controller is further configured to execute the applet to find content matching the search query and to determine whether the content matching the search query is cached at the content engine. The controller then includes into the least one dynamic portion of the channel portal template links to channel content cached at the content engine. The portal page is active as well as dynamic and accordingly more portable than a non-active page. Additionally, the user can modify, using the search query, the data returned in the generated portal page.

Another method embodiment of the present invention provides a method in a content distributed network for dynamically providing a Web portal to the content distributed network. The method includes the step of providing a manifest file to establish a channel of content in the content distributed network where the manifest file describes the channel content, and further includes a portal template having at least one dynamic portion. At least one content engine is connected to the network. The at least one content engine caches a portion of channel content and the portal template. The at least one content engine receives a request for the Web portal from a client system. The at least one content engine accesses the portal template in response to the request. The at least one content engine includes into the at least one dynamic portion of the portal template links to content cached in the content engine to generate a Web portal page. The at least one content engine then provides the Web portal page to the client system. The content distributed network includes a Web-based interface that is the dynamic portal page. The dynamic portal page provides information about data that is locally cached at the content engine as well as data about the status of uncached data. This provides the user with the opportunity to focus on available data and avoid data that would slow interaction with the content distributed network.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views.

DETAILED DESCRIPTION

In a content distributed network, a content engine dynamically generates portal pages based on content availability and user location. The portal page displays content that is available at the content engine and further includes information about content that is not yet available at the content engine including information about content that will become available at some point in the future.

Figure 1:
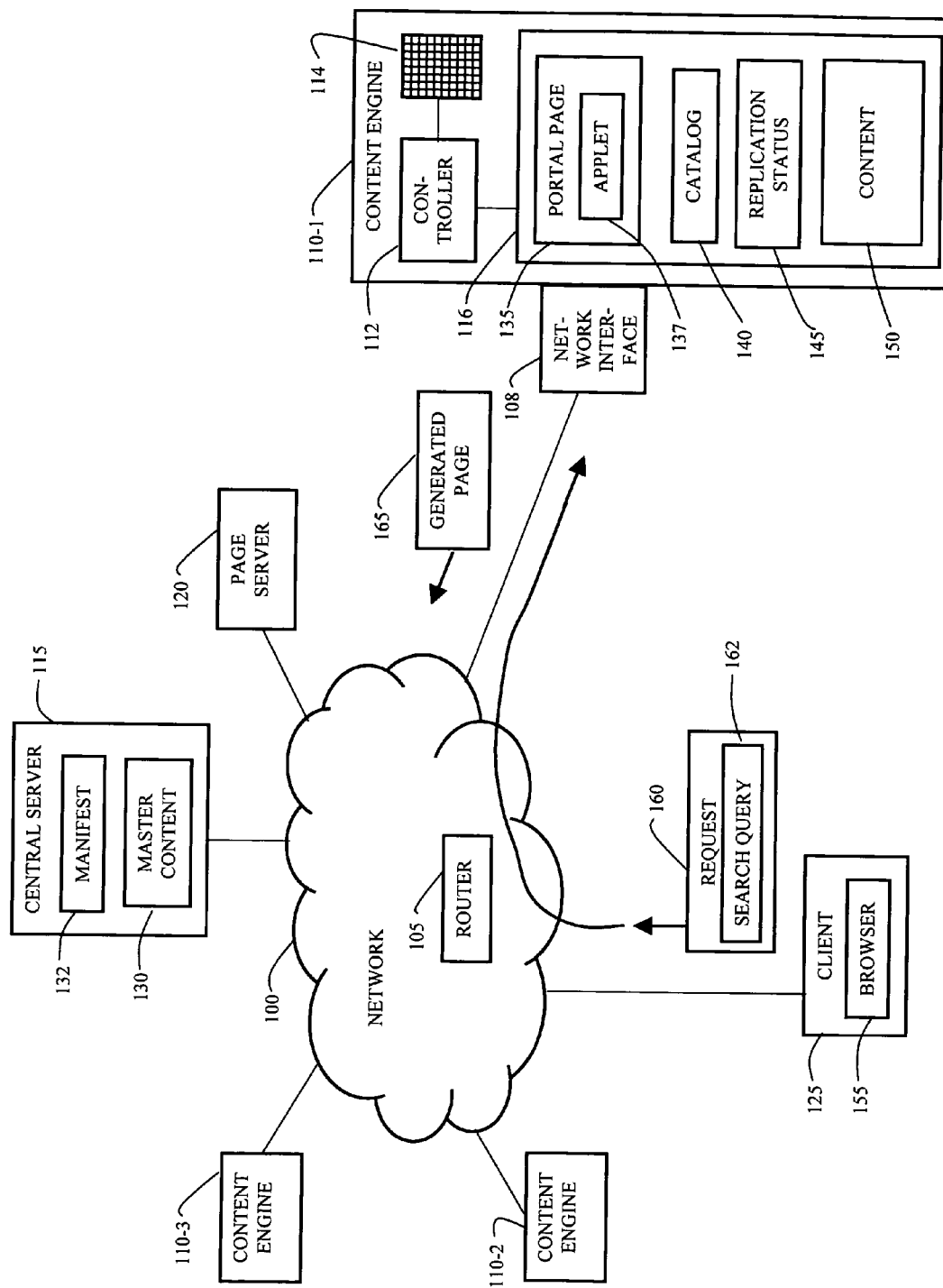
FIG. 1 is a block diagram of a content distributed network including a system for providing a dynamic portal page according to principles of the invention.

FIG. 1 is a computing environment including an embodiment of the dynamic portal page system of the invention. FIG. 1 includes a network 100 such as a content distributed network (CDN). The network 100 includes at least one router 105. A central server 115 and a page server 120 are connected to the network 100. The central server 115 has a master set of content ("master content") 130 carried in the network 100 and a manifest file 132 listing the data in the master content 130. The page server 120 serves dynamic portal page templates in one of the alternative embodiments of the invention to be described below. A plurality of content engines 110-1, 110-2, 110-3 (generically and collectively "content engine(s) 110") are connected to the network 100. The content engines 110 store at least a portion of the master content 130 so that clients requesting data contained in the master content 130 may be able to access the data from one of the content engines 110 rather than from the central server 115. This reduces load on the central server 115 and eases network traffic as the content engine 110 is typically closer in network terms to the client 125 making the request than the central server 115. Content engine 110-1 is shown in greater detail than the other content engines for convenience. All the content engines 110-1, 110-2, 110-3 are similar in structure.

The content engine 110-1 includes a network interface 108, a controller 112, a memory 114 and a storage device 116. The storage device 116 stores a portal page template 135, a catalog 140, a replication status 145 and content 150. In one embodiment of the invention, the portal page template 135 includes at least one dynamic portion, or page area, which is filled in by the content engine 110-1 in response to a client request 160. In another embodiment of the invention, the portal page template 135 is completely dynamic. In a still further embodiment of the invention, the portal page template 135 includes an applet 137 in Java or some other cross-platform portable language. The catalog 140 is a record of content 150 to be carried at the content engine 110-1, typically a list of files. The replication status 145 is the status of the information to download from the central server 115 compared to the catalog. In an alternative embodiment, the replication status 145 further includes information about files in the process of downloading from the central server 115 to the content engine 110-1. In a still further alternative embodiment of the invention, the replication status 145 includes a report on files to be downloaded in the future from the central server 115. The content 150 is a subset of the master content 130 at the central server 115.

The client 125 is also connected to the network 100. The client 125 includes a browser 155 for accessing the network 100. The browser 155, in a first embodiment of the invention, is any browser capable of generating a request 160. In another alternative embodiment of the invention, the browser 155 is encoded to direct requests to a specific content engine, in this example, to content engine 110-1. In an alternate embodiment of the invention, the request 160 includes a search query 162.

In operation, the client 125 activates the browser 155 and sends requests 160 for information, including requests 160 for the portal page 135 and requests 160 for data within the content 150 at the content engine 110-1 or stored at the master content 130 at the central server 115. The router 105 intercepts the requests 160 from the client 125 and redirects them to a content engine 110-1. In a first embodiment, the router 105 decides which content engine is to receive the request 160. The router 105 selects, for example the content engine 110-1, which, in this embodiment, is defined as the closest content engine 110, in terms of network distance, to the client 125. The router 105 may use criteria other than network proximity to select a content engine 110. In another embodiment of the invention in which the browser 155 is encoded with the content engine selection, such as content engine 110-1, the router 105 routes the client request 160 to the content engine 110-1 as directed in the client request as generated by the browser 155. The client's first request is typically for portal page 135 through which the client may access the content 150. The content engine 110-1, in response to the client request 160, generates a portal page 165.

The portal page template 135 has at least one dynamic portion by the content engine 110-1 with links to the content 150. The content engine 110-1 transmits the generated page 165 to the client 125 thereby providing the client 125 with links to data currently stored in the content engine 110-1 as content 150. The content engine 110-1 in one embodiment, inserts active links to files currently available at the content engine 110-1. In an alternative embodiment of the invention, the content engine 110-1 inserts links to the files currently available at the content engine and links to files to be available in the future. The links include indicators of content availability. Example indicators are highlighting active links and dimming inactive links, providing a descriptor word such as available or unavailable, or showing active links and hiding inactive links. In a further alternative embodiment, the time of availability is included. Also, the size of the file associated with the link. Other content metadata may be inserted into the dynamic portion of the dynamic web page within the scope of the invention. The metadata is not limited to the metadata listed above. The operation of the content engine 110-1 in generating the page 165 and the associated metadata will be described in greater detail below.

The portal page template in the above example embodiment is available at the content engine 110-1. In other embodiments, another server in the network such as the portal page server 120 provides the content engine 110-1 with a portal page template. The central server 115 may also be used to provide portal page templates. The advantages of using servers other than the content engine 110-1 is that more up-to-date templates may be served conveniently from servers other than the content engine 110-1. The central server 115, for example, may store a master set of templates with the master content.

Figure 2:
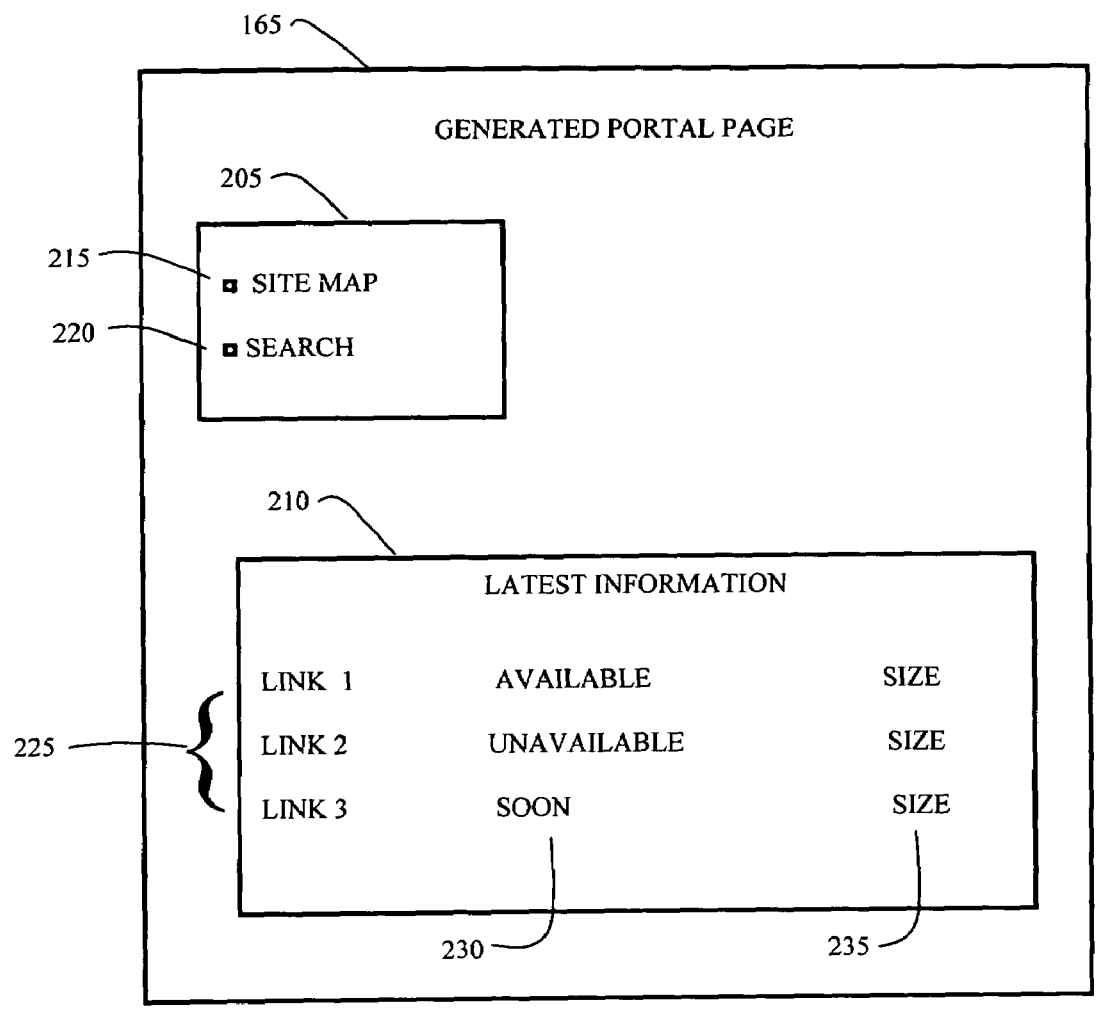
FIG. 2 is a block diagram of an example dynamic portal page according to principles of the invention.

FIG. 2 is a block diagram of an example generated portal page 165 typical of dynamic portal pages generated by the content engine 110-1 shown in FIG. 1. The generated portal page 165 is, for example, a portal page for an organization or an Internet service provider with announcements or other dynamic data. This example portal page 165 includes a static portion 205 and a dynamic portion 210. Other configurations of the dynamic portal page are possible within the scope of the invention. The static portion 205 could contain any data that the portal page administrator decides to include. In the example embodiment shown in FIG. 2, the static portion 205 of the page 165 contains tools, a site map 215 and a search tool 220. The items in the static portion are provided as examples only.

The dynamic portion 210 is filled by the content engine 110-1 in response to the client request 160. The dynamic portion 210 of this example portal page 165 includes a number of links 225 to files, link 1, link 2, and link 3. Each link 225 includes an availability indicator 230 and a size of the file 235. As illustrated in FIG. 2, link 1 is marked "available" and therefore is a link to a file stored in the content engine 110-1 as content 150. Link 2 is marked "unavailable" and therefore is a link to a file that is not stored in the content engine 110-1 as content 150. Link 3 is marked "soon" and accordingly is a link to a file that will be available in the content engine 110-1 at some point in time. The link 3 file could, for example, be in the process of being downloaded from the central server 125. Also, the information about availability in alternative embodiments is more detailed and could include a time of availability, for example. In a still further alternative embodiment of the invention, the dynamic portion 210 includes greater detail about unavailable content such as content name, topic and date as well as size. In other alternative embodiments of the invention, the page 165 has more than one dynamic portion 210. In a still further alternative embodiment, the page is entirely dynamic.

The client 125 is provided with the generated portal page 165 in response to the request 160. Specifically, as illustrated in FIG. 2, the client 125 receives a portal page including links to data that is currently available at the content engine 110-1. The client 125 also receives, in the portal page 165, information about both data that is currently available and data that is not currently available at the content engine 110-1. The benefit to the user is that the user may avoid lengthy waits for data that is not available at the content engine 110-1. The user is notified about potentially large files to download from the content engine 110-1.

Figure 3:
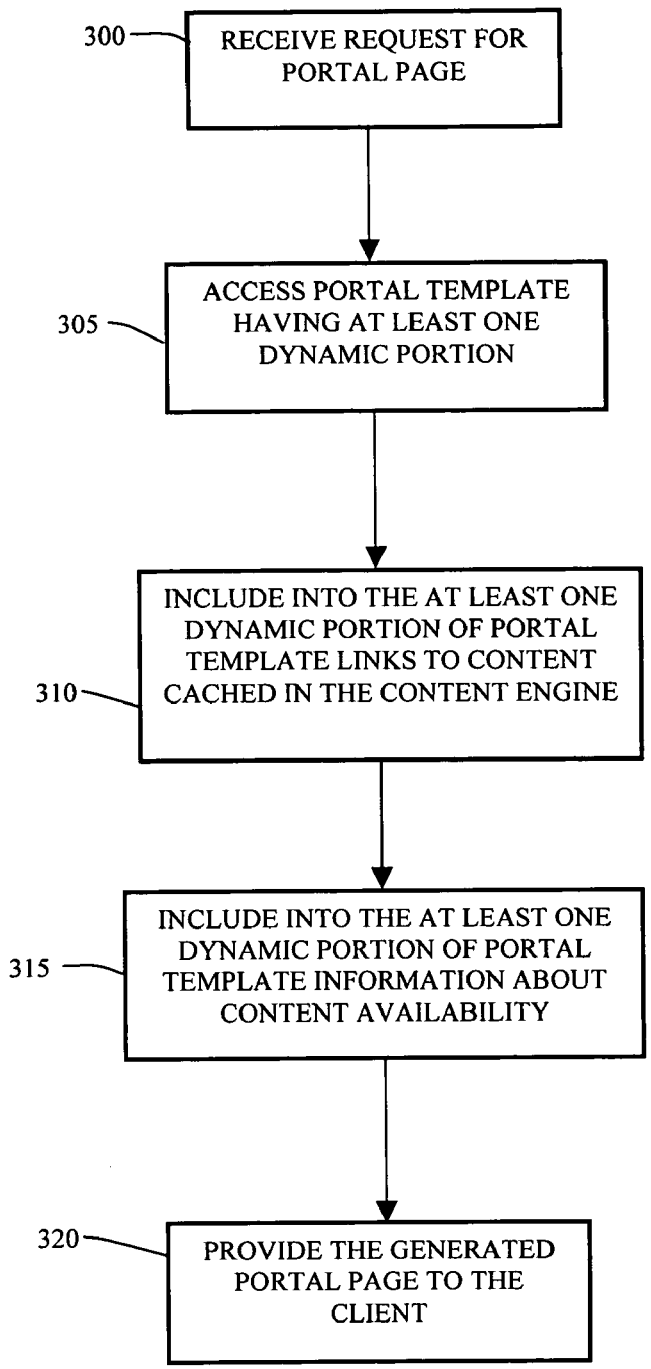
FIG. 3 is a flow chart of the operation of the content engine of FIG. 1 in generating the dynamic portal page of FIG. 2.

FIG. 3 is a flow chart of the operation of the content engine in generating the dynamic portal page 165.

At step 300, the content engine 110-1 receives a request 160 for the portal page from the client system 125. As described above, the client 125 sends the request 160 into the network 100 where the router 105 directs the request 160 to the content engine 110-1. In one embodiment, the router 105 decides which content engine 110-1 should receive the request 160. In another embodiment, the browser 155 in the client 125 is encoded with a particular content engine 110-1. The browser 155 includes the address of the content engine 110-1 into the request 160. The router 105 then forwards the request 160 to the content engine 110-1 as directed in the request 160.

At step 305, the content engine 110-1 accesses a portal page template 135 in response to the request 160 received in step 300. The portal page template 135 has at least one dynamic portion 210 to be filled by the content engine 110-1. In a first embodiment of the invention, the content engine 110-1 stores the portal page template 135 to be used to generate the portal page 165 in response to the request 160. In an alternative embodiment, the content engine 110-1 accesses the portal page template 135 from another server in the network 100 such as the page server 120 or the central server 115.

At step 310, the content engine 110-1 includes into the least one dynamic portion 210 of the portal template links to content cached in the content engine 110-1 to generate a portal page 165. In one embodiment of the invention, the content engine 110-1 determines content availability by comparing the requested data with the content 150. The content engine 110-1 then enters links 225 to files stored in the content 150 in the storage device 116. In another embodiment of the invention, the content engine 110-1 belongs to a channel in a CDN and so has pre-positioned data. In this embodiment, the content engine 110-1 has the catalog 140 listing the files that should be in the content 150 according to the manifest file 132 at the central server 115. As described above, the manifest file 132 describes the data to be pre-positioned in the content engine 110-1. The content engine also has a replication status 145 describing the download status of the files described in the catalog 140. The content engine 110-1, in determining which links to enter into the dynamic portion 210 of the portal page template 135, compares the data requested in the request 160 to data in the replication status 145 in order to insert links 225 to files in the content 150 into the dynamic portion 210 of the dynamic portal template 137. The content engine 110-1 inserts links to available files in the content engine. In an alternative embodiment, the content engine 110-1 also lists unavailable content marked as unavailable as discussed in the next step.

At step 315, the content engine 110-1 includes into the least one dynamic portion 210 of the portal page template 135 information about content availability. The content engine 110-1 determines availability of requested content by comparing the request 160 to the content 150 or by comparing the request to the replication status 145. The content engine 110-1 enters an availability indicator with each link included in the dynamic portion 210 of the portal page template 135. As described above in association with FIG. 2, the content engine 110-1 marks links as available or unavailable, or highlights available links while dimming unavailable links, or by showing available links while hiding unavailable links. In an alternative embodiment, the content engine 110-1 also includes an indicator of when content may be available. In a still further embodiment of the invention, the content engine 110-1 provides a file size with the link thus alerting the user to potentially lengthy downloads.

At step 320, the content engine 110-1 provides the generated portal page to the client 125.

Figure 4:
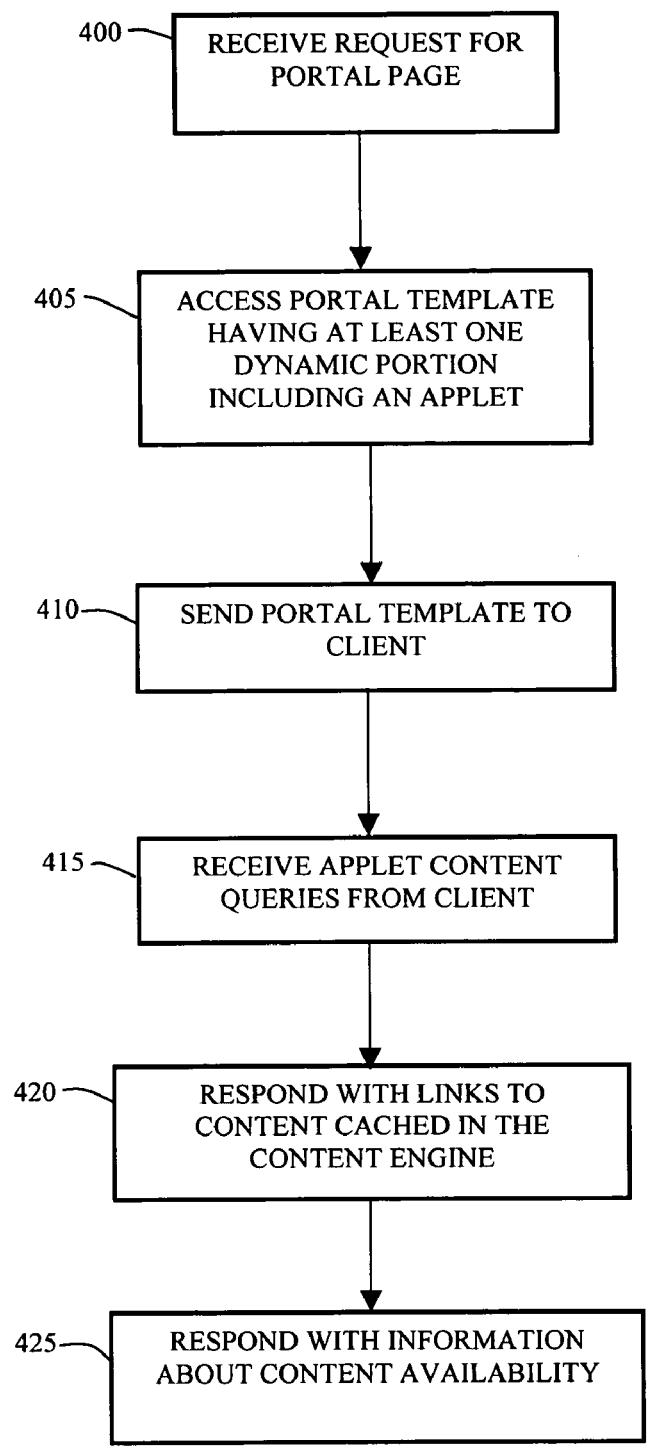
FIG. 4 is a flow chart of the operation of the content engine of FIG. 1 where the portal page template includes and applet.

FIG. 4 is a flow chart of the operation of the content engine of the present invention where the portal page template 135 includes an applet 137.

At step 400, the content engine 110-1 receives a request 160 for the portal page from the client 125. The request 160 is sent from the client 125 and received at the content engine 110-1 as described above in step 300 with regard to FIG. 3.

At step 405, the content engine 110-1 accesses, as described above in step 305 of FIG. 3, a portal page template 135 in response to the request 160 received in step 300. The portal page template 135 has at least one dynamic portion 210 to be filled by the content engine 110-1. The portal page template 135 also has an applet 137, a program written in a portable language executable on a plurality of computer platforms. The applet 137 is, for example, a Java script. The applet 137 is to be executed by the client 125 when the client 125 receives the portal page template 135 in response to the request 160.

At step 410, the content engine 110-1 sends the portal page template 135 including the applet 137 to the client 125 in response to the request 160. The applet 137 requests data to be inserted into the dynamic portion 210 of the portal page template 135. In a first embodiment of the invention, the browser 155 executes the applet 137 without further input from the client 125. In a second embodiment of the invention, the browser 155, executing the applet 137, takes input from the client 125 to include in the request 160. The input is, for example a search query 162. Alternatively, the input is, for example a client data status. The input is, for example, any client information alerting the content engine 110-1 to content desired by the client 125. The applet 137 generates at least one content query that the client includes into a request 160 returned to the content engine 110-1.

At step 415, the content engine 110-1 receives the at least one content query in the request 160 from the client 125. The content engine 110-1 finds cached data matching the content query. The content engine 110-1 also determines whether there is uncached data matching the content query and further determines the status of the uncached data, such as whether the files are in the process of downloading to the content engine 110-1.

At step 420, the content engine 110-1 responds to the at least one content query in the request 160 with links 225 to content 150 cached in the content engine 110-1 which the portal page template 135 incorporates into the at least one dynamic portion of the portal page template 135 already at the client 125.

At step 425, the content engine 110-1 responds further to the at least one content query with information about availability for that data which was not stored in the content engine 110-1.

Figure 5:
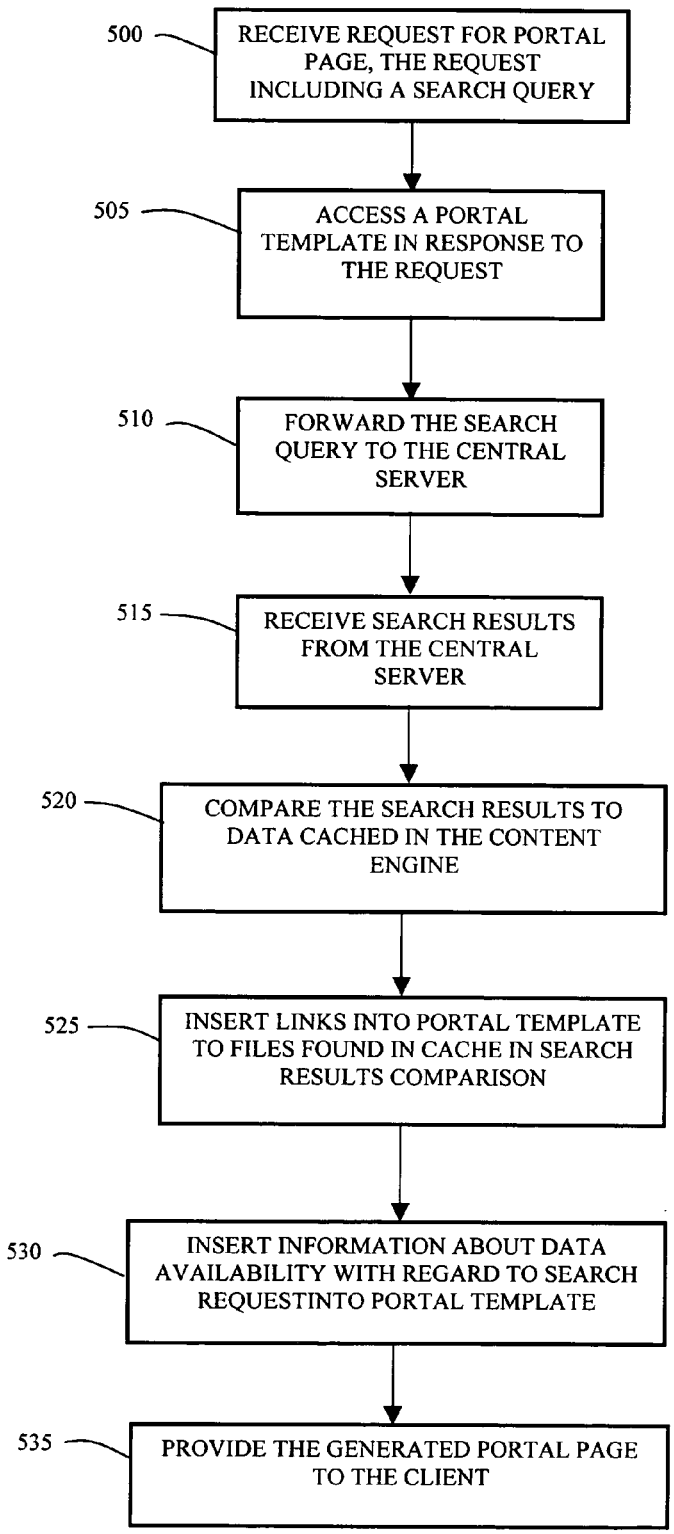
FIG. 5 is a flow chart of the operation of the content engine of FIG. 1 where a received client request includes a search query.

FIG. 5 is a flow chart of the operation of the content engine of the present invention where the client request 160 includes a search query.

At step 500, the content engine 110-1 receives a request 160 for the portal page from the client 125. The request 160 is sent from the client 125 and received at the content engine 110-1 as described above in step 300 with regard to FIG. 3. The request 160 in this embodiment further includes a search query 162.

At step 505, the content engine 110-1 accesses, as described above in step 305 of FIG. 3, a portal page template 135 in response to the request 160 received in step 300. The portal page template 135 has at least one dynamic portion 210 to be filled by the content engine 110-1 with data requested in the search query 162 portion of the client request 160.

At step 510, the content engine 110-1 forwards the search query 162 to the central server 115 so that the central server 115 will perform a search on the master content 130. Using the central server 115 for searching is merely exemplary. Other types of searches are possible within the scope of the invention. For example, any server having an index of available data in the network could be used to receive the search query 162 and to search for data matching the request.

At step 515, the content engine 110-1 receives search results from the central server 115. Typically, the search results are pointers such as file identifiers.

At step 520, the content engine 110-1 compares the received search results to data cached in the content engine 110-1 as the content 150. The content engine performs the comparison as described above in step 310 of FIG. 3.

At step 525, the content engine 110-1 inserts links into the dynamic portion 225 of the portal page template 135 to files found in the content 150 resulting from the comparison at step 520.

At step 530, the content engine 110-1 inserts information into the dynamic portion 225 of the portal page template 135 about data availability with regard to the search query 162. That is, the content engine 110-1 in one embodiment of the invention, provides information about the files found in the central server 115 but not cached in the content engine 110-1. This information alerts a user at the client system 125 to data available generally in the network but not yet locally available at the content engine 110-1. In an alternative embodiment, the information included by the content engine 110-1 into the dynamic portion 225 of the portal page template 135 includes information about when data will be locally available.

At step 535, the content engine 110-1 provides the generated portal page 165 to the client 125.

Figure 6:
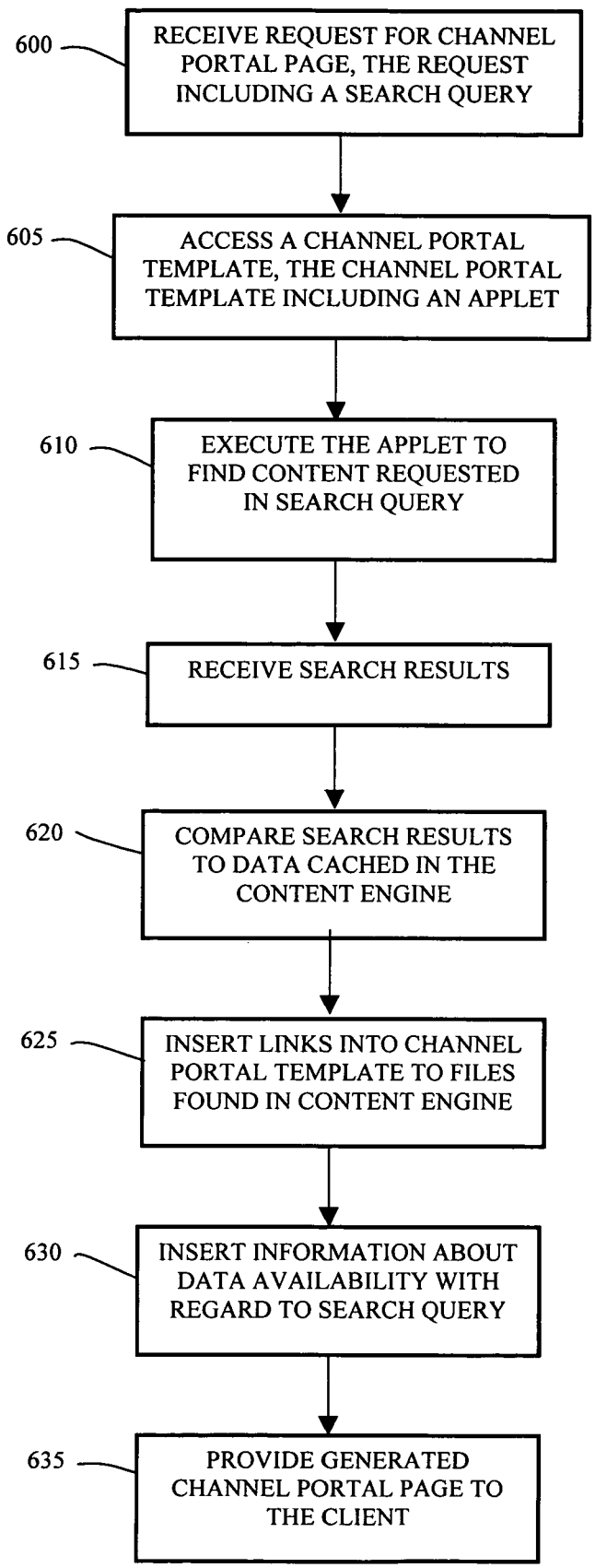
FIG. 6 is a flow chart of the operation of the content engine of FIG. 1 where a received client request includes a search query and the portal page template is a channel portal page template and includes an applet.

FIG. 6 is a flow chart of the operation of the content engine of the present invention where the client request 160 is for a channel portal page and also wherein the client request 160 includes a search query. Further, the channel portal page template includes an applet.

At step 600, the content engine 110-1 receives a request 160 for the portal page from the client 125. The request 160 is sent from the client 125 and received at the content engine 110-1 as described above in step 300 with regard to FIG. 3. The request 160 in this embodiment includes a search query 162.

At step 605, the content engine 110-1 accesses, as described above in step 305 of FIG. 3, a portal page template 135 in response to the request 160 received in step 300. The portal page template 135 has at least one dynamic portion 210 to be filled by the content engine 110-1. The portal page template 135 also has an applet 137, a program written in a portable language executable on a plurality of computer platforms. The applet 137 is, for example, a Java script. The applet 137 accepts two inputs, a first input of the search query 162 and a second input of a list of content in the channel.

At step 610, the content engine 110-1 executes the applet 137 to find content requested by the search query 162 in the request 160.

At step 615, the content engine 110-1 receives search results matching the search query 162 in response to executing the applet 137. The content engine 110-1 finds matching content as described above in step 510 of FIG. 5.

At step 620, the content engine 110-1 determines whether files matching the results of the search results of the search query are cached at the content engine 110-1. The content engine 110-1 accomplishes this by comparing the search results to the data cached in the content engine 110-1 as content 150.

At step 625, the content engine 110-1 inserts links to the channel portal template to files found in the content engine 110-1.

At step 630, the content engine 110-1 inserts information about data availability with regard to the search query 162.

At step 635, the content engine 110-1 provides the generated channel portal page 165 to the client 125.

The dynamically generated portal page of the present invention encourages end users at client system to avoid clicking on links to files that are not locally available. This, in turn, reduces the possibility of flooding at a central information site because requests to the central server for data not locally available are generally avoided. This improves the network experience of the end user by providing fast information when information is locally available and by alerting the end user to a source of time-out errors when the information is not locally available. Alternative embodiments to the present invention include caching of a plurality of portal page templates at the content engines in order to meet a variety of client requests. Further alternatively, the plurality of portal page templates are stored in another type of server other than a content engine such as a central server or a portal page server. In a still further alternative embodiment, the content distributed network is Web-based and includes a channel and the dynamic portal page is a Web portal to the channel.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with a dynamic portal method that when performed on the processor, produces a process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with a dynamic portal system that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A method performed in a computer configured as a content engine, the method comprising dynamically providing a portal in a content distributed network by:

receiving a request for the portal from a client system;

accessing a portal template in response to the request, the portal template having at least one dynamic portion, and the portal template being stored on a storage device;

inserting into the at least one dynamic portion of the portal template links to content cached in the content engine, where inserting links to content cached in the content engine comprises checking a replication status of the content engine to determine available cached content, inserting into the at least one dynamic portion of the portal template links to content found in the replication status, and hiding at least one link to content not found in the replication status in the at least one dynamic portion of the portal template;

inserting into the at least one dynamic portion of the portal template information about content availability to generate a portal page, where inserting information about content availability comprises comparing a replication status to a catalog of files carried in the content engine to determine what files are locally cached and what files remain to be downloaded, and writing a list of files that remain to be downloaded to the portal page with an indicator of unavailability; and providing the portal page to the client system;

wherein the method is performed by one or more computing devices.

2. The method of claim 1, where the portal template includes at least one applet and where inserting links into the portal template comprises running the at least one applet to acquire at least one pointer to content cached in the content engine.

3. The method of claim 2, comprising providing the portal template having at least one applet to the client system and where the client system instantiates the portal template including at least one applet and executes the at least one applet to acquire content cached in the content engine.

4. The method of claim 1, where accessing the portal template comprises reading a template stored in the content engine.

5. The method of claim 1, where accessing the portal template comprises accessing the template stored at a portal page server in the content distributed work.

6. The method of claim 1, where the request is a redirected request from the client system that has been redirected away from a central site and to the content engine by a content router in the content distribution network.

7. The method of claim 1, where the request is a search request and where the method comprises:
querying a central server in response to the search request; and
receiving a list of files in response to querying the central server; and
where inserting links to content comprises including links to files from the list cached in the content engine.

8. The method of claim 1, where the request is received at the content engine based on a network location of the content engine with respect to the client system.

9. A method in a content engine for dynamically providing a portal to a channel in a content distributed network, the channel having content, comprising:
receiving a request for the channel portal from a client system;
accessing a channel portal template in response to the request, the channel portal template having at least one dynamic portion, and the channel portal template being stored on a storage device;
including into the at least one dynamic portion of the channel portal template links to content cached in the content engine, where including links to content cached in the content engine comprises checking a replication status of the content engine to determine available cached content, inserting into the at least one dynamic portion of the portal template links to content found in the replication status, and hiding at least one link to content not found in the replication status in the at least one dynamic portion of the portal template;

inserting into the at least one dynamic portion of the portal template information about content availability to generate a portal page, where inserting information about content availability comprises comparing a replication status to a catalog of files carried in the content engine to determine what files are locally cached and what files remain to be downloaded, and writing a list of files that remain to be downloaded to the portal page with an indicator of unavailability; and providing the channel portal page to the client system;

wherein the method is performed by one or more computing devices.

10. The method of claim 9, where including links to content includes the steps of:
checking a replication status of the content engine to determine channel content available at the content engine; and
including into the at least one dynamic portion of the channel portal template links to channel content found in the replication status to generate the channel portal page.

11. The method of claim 9, where the request includes a search query for content in the channel, where the channel portal template includes an applet accepting a first input of the search query and a second input of a list of content in the channel and where including links to content includes:
executing the applet to find content matching the search query;
determining whether the content matching the search query is cached at the content engine; and
including into the at least one dynamic portion of the channel portal template links to channel content cached at the content engine.

12. A content engine for dynamically providing a portal in a content distributed network, comprising:
a network interface to receive a request for a portal from a client system;
a storage device to store content from the content distributed network and a portal template having at least one dynamic portion, and the portal template being stored on a storage device; and
a controller coupled to the interface and the storage device, the controller configured
to access the portal template in response to the request,
to include in the at least one dynamic portion of the portal template links to content cached in the content engine, where including links to content cached in the content engine comprises checking a replication status of the content engine to determine available cached content, inserting into the at least one dynamic portion of the portal template links to content found in the replication status, and hiding at least one link to content not found in the replication status in the at least one dynamic portion of the portal template,
to insert into the at least one dynamic portion of the portal template information about content availability to generate a portal page, where inserting information about content availability comprises comparing a replication status to a catalog of files carried in the content engine to determine what files are locally cached and what files remain to be downloaded, and writing a list of files that remain to be downloaded to the portal page with an indicator of unavailability, and to provide the portal page to the client system.

13. The content engine of claim 12 wherein the storage device further includes a replication status of the content engine and the controller is further configured to check the replication status to determine available cached content, the controller further to include into the at least one dynamic portion of the portal template links to content found in the replication status.

14. The content engine of claim 12 wherein the portal template includes at least one applet and the controller is further configured to run the at least one applet to acquire at least one pointer to content cached in the content engine.

15. The content engine of claim 12 wherein the portal is a channel portal and the portal template is a channel portal template and the controller is further configured to include into the at least one dynamic portion of the channel portal template links to content cached in the content engine to generate a channel portal page.

16. The content engine of claim 15 wherein the storage device further stores a replication status of the content engine and the controller is further configured to check the replication status to determine channel content available at the content engine and to include into the at least one dynamic portion of the channel portal template links to channel content found in the replication status to generate a channel portal page.

17. The content engine of claim 15 wherein the request includes a search query for content in the channel, wherein the channel portal template includes an applet that accepts a first input of the search query and a second input of a list of content in the channel, and wherein the controller is further configured to execute the applet to find content matching the search query, to determine whether the content matching the search query is cached at the content engine, and to include into the at least one dynamic portion of the channel portal template links to channel content cached at the content engine.

18. A method in a content distributed network for dynamically providing a Web portal to the content distributed network, comprising:
   providing a manifest file to establish a channel of content in the content distributed network, the manifest file describing channel content, the manifest file further including a portal template, the portal template including at least one dynamic portion, and the portal template being stored on a storage device;
   providing at least one content engine to cache a portion of channel content and to cache the portal template;
   receiving at the at least one content engine a request for the Web portal from a client system;
   accessing by the at least one content engine the portal template in response to the request;
   including by the at least one content engine into the least one dynamic portion of the portal template links to content cached in the content engine, where including links to content cached in the content engine comprises checking a replication status of the content engine to determine available cached content, inserting into the at least one dynamic portion of the portal template links to content found in the replication status, and hiding at least one link to content not found in the replication status in the at least one dynamic portion of the portal template;
   inserting into the at least one dynamic portion of the portal template information about content availability to generate a portal page, where inserting information about content availability comprises comparing a replication status to a catalog of files carried in the content engine to determine what files are locally cached and what files remain to be downloaded, and writing a list of files that remain to be downloaded to the portal page with an indicator of unavailability; and
   providing by content engine the Web portal page to the client system;
   where the method is performed by one or more computing devices.

19. A computer-readable medium having stored thereon computer executable instructions that when executed by a computer cause the computer to perform a method, the method comprising:
   receiving a request for the portal from a client system;
   accessing a portal template in response to the request, the portal template having at least one dynamic portion, and the portal template being stored on a storage device;
   including into the at least one dynamic portion of the portal template links to content cached in the content engine, where including links to content cached in the content engine comprises checking a replication status of the content engine to determine available cached content, inserting into the at least one dynamic portion of the portal template links to content found in the replication status, and hiding at least one link to content not found in the replication status in the at least one dynamic portion of the portal template;
   inserting into the at least one dynamic portion of the portal template information about content availability to generate a portal page, where inserting information about content availability comprises comparing a replication status to a catalog of files carried in the content engine to determine what files are locally cached and what files remain to be downloaded, and writing a list of files that remain to be downloaded to the portal page with an indicator of unavailability; and
   providing the portal page to the client system.

20. The computer-readable medium of claim 19, wherein the instructions that cause the operation of including links to content further comprise instructions which when executed cause:
   checking a replication status of the content engine to determine channel content available at the content engine; and
   including into the at least one dynamic portion of the channel portal template links to channel content found in the replication status to generate the channel portal page.

21. The computer-readable medium of claim 19, wherein the request includes a search query for content in the channel, wherein the channel portal template includes an applet accepting a first input of the search query and a second input of a list of content in the channel and wherein the instructions that cause the operation of including links to content further comprise instructions which when executed cause:
   executing the applet to find content matching the search query;
   determining whether the content matching the search query is cached at the content engine; and
   including into the at least one dynamic portion of the channel portal template links to channel content cached at the content engine.

* * * * *